United States Patent [19]

Hoffman et al.

[11] Patent Number: 4,899,995
[45] Date of Patent: Feb. 13, 1990

[54] CLAMP RING ASSEMBLY FOR AIR SPRING

[75] Inventors: Keith E. Hoffman, Atlanta; Wayne H. Geno, Cicero, both of Ind.; David A. Weitzenhof, Akron, Ohio

[73] Assignee: Bridgestone/Firestone, Inc., Akron, Ohio

[21] Appl. No.: 291,908

[22] Filed: Dec. 29, 1988

[51] Int. Cl.$^4$ .............................................. F16F 9/36
[52] U.S. Cl. ................................ 267/64.27; 267/64.24
[58] Field of Search ................ 267/35, 64.19, 64.21, 267/64.23, 64.24, 64.27, 122

[56] References Cited

U.S. PATENT DOCUMENTS

| | | | |
|---|---|---|---|
| 3,244,013 | 4/1966 | Deschner | 267/64.27 X |
| 3,788,628 | 1/1974 | Hotz, Jr. et al. | |
| 3,870,286 | 3/1975 | Willich | |
| 4,489,474 | 12/1984 | Brown et al. | 29/508 |
| 4,573,692 | 3/1986 | Frank et al. | 277/152 |
| 4,629,170 | 12/1986 | Warmuth, II | 267/64.27 |
| 4,657,229 | 4/1987 | Thurow | 267/64.27 |
| 4,718,650 | 1/1988 | Geno | 267/64.27 |
| 4,784,376 | 11/1988 | Ecktman | 267/64.27 |
| 4,787,606 | 11/1988 | Geno et al. | 267/64.27 |
| 4,787,607 | 11/1988 | Geno et al. | 267/64.27 |

FOREIGN PATENT DOCUMENTS 911789 2/1961 United Kingdom .

Primary Examiner—Duane A. Reger
Attorney, Agent, or Firm—Ronald Brietkrenz

[57] ABSTRACT

An air spring formed by an axially spaced end member and a piston member with an intervening elastomeric flexible sleeve therebetween which forms a fluid pressure chamber. An annular clamp ring having a recess on the inner diameter thereof coacts with a corresponding annular projection on the outer diameter of the rigid piston member to positionally locate the ring on the piston member. A pair of clamping surfaces are located on opposite sides of the projection and are separated therefrom by expansion grooves. The projection and clamping surfaces form a series of pinch areas with the intervening sleeve, which sealingly clamp the sleeve therebetween. The expansion grooves receive portions of the sleeve and change the direction of reinforcing cords within the sleeve. Another radially extending groove traps a partially compressed end of the sleeve therein and provides an additional material expansion area. The clamp ring seats upon a shoulder of the piston member to reduce movement of the ring during operation of the air spring. The positioning of the ring proximate to the edge of the piston member provides a substantially continuous surface on which the sleeve rolls during operation of the air spring to reduce wear on the sleeve.

28 Claims, 2 Drawing Sheets

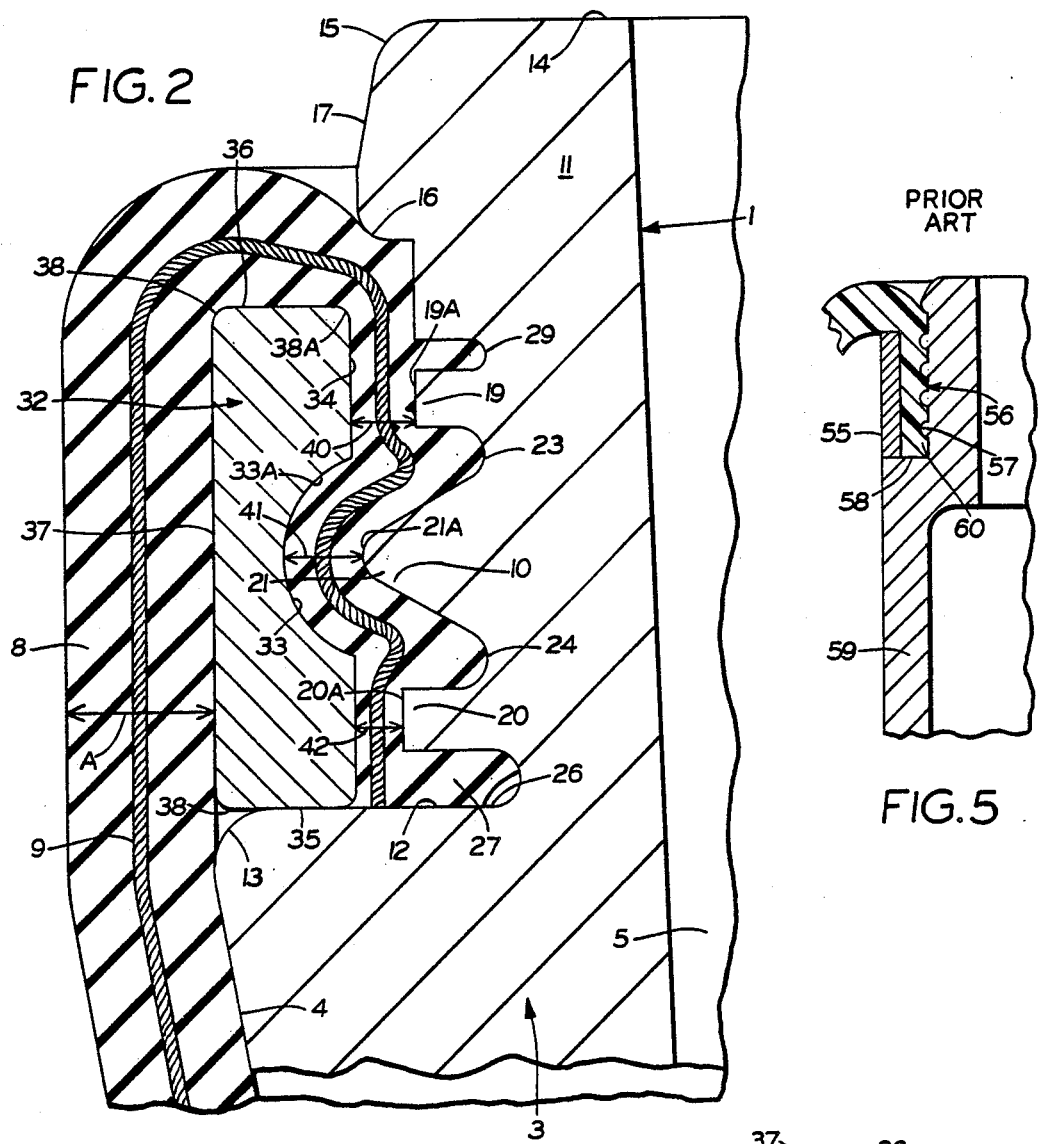
FIG. 2
FIG. 5 PRIOR ART
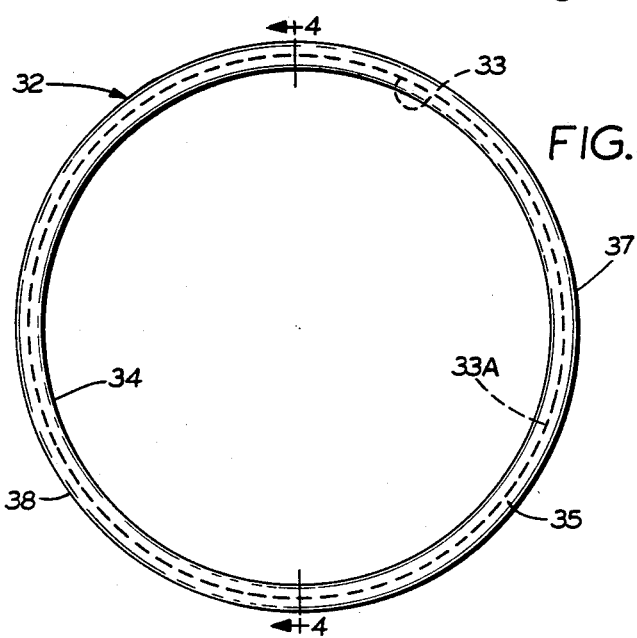
FIG. 3
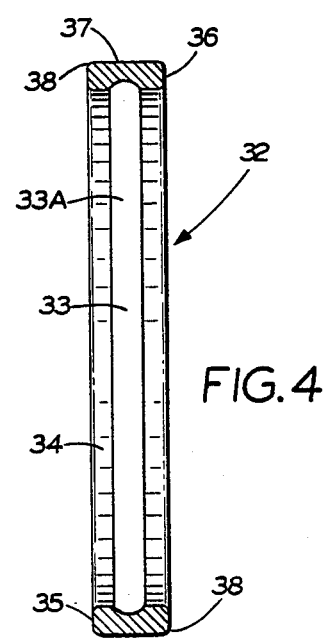
FIG. 4

CLAMP RING ASSEMBLY FOR AIR SPRING

BACKGROUND OF THE INVENTION

1. Technical Field

The invention relates to clamping means and more particularly to the clamping means adapted to affix a resilient elastomeric sleeve member to a relatively rigid piston member or end cap of an air spring. Specifically, the air spring invention relates to a clamp ring assembly employing a clamping ring having a recess on the inner diameter thereof which coacts with a corresponding projection on the outer diameter of the piston member or end cap to positionally locate the clamping ring on the piston member and to effectively seal the open end of the elastomeric sleeve therebetween.

2. Background Information

Pneumatic springs commonly referred to as air springs, have been used for motor vehicles for a number of years to provide cushioning between moveable parts of the vehicle, primarily to absorb shock loads impressed on the vehicle axles by the wheels striking an object in the road or falling into a depression. The air spring usually consists of a flexible rubber sleeve or bellows containing a supply of compressed fluid and has one or more pistons located within the flexible sleeve. The piston causes compression and expansion of the fluid within the sleeve as the sleeve compresses and expands as the vehicle experiences the road shock. The spring sleeve is formed of a flexible elastomeric material which permits the piston to move axially with respect to another piston or end cap secured within the ends of the sleeve.

The ends of the sleeves are sealingly connected to the piston and/or opposite end cap and are always one of the important and major aspects in producing an efficient and maintenance free air spring. One problem with certain air springs is that the exposed cut edge at the end of the elastomeric sleeve of the air spring will engage the sleeve body as it rolls along the piston or end cap in excessive stroke conditions causing excess wear to the flexible sleeve. Another problem with existing air springs, and in particular, the clamp ring therefore, is that the clamp ring will move in its clamped position under dynamic air spring conditions causing movement of the clamped elastomeric material therebetween tending to loosen the sealing engagement and deteriorating the clamp integrity and causing ultimate air spring leakage and failure. This ring movement is especially critical during the jounce or collapsing stroke.

Another problem with existing air springs and the clamping of the elastomeric sleeve ends to the piston member and/or end cap is to secure a sufficiently tight seal to be able to withstand high fluid pressures contained in the fluid chamber without premature leakage or bursting even upon experiencing severe air spring movement and being exposed to the harsh environments on the undercarriage of a vehicle.

Some examples of air springs and band sealing devices are shown in the following patents described below:

U.S. Pat. No. 3,788,628 discloses a pneumatic spring-type system including a structure or anchoring the inner ends of a flexible rolling sleeve. The sleeve is positioned between surfaces characterized by having a sawtoothed shape with a circumferential groove and rib on an inner circumferential surface and two ribs on an outer circumferential surface. The opposite sides of the grooves converge at predefined angles with predetermined and matching radius of curvatures, the combination of which provides a gripping action to hold the flexible sleeve firmly in place by means of the saw-tooth design in cooperation with the matching recess of the ring and sleeve flange.

U.S. Pat. No. 3,870,286 relates to a fluid spring wherein the ends of the rolling sleeve are secured by annular clamping rings which engage against the internal surface of the sleeve. The clamping ring secures the rolling sleeve to the working cylinder with the clamping ring containing an annular groove type deformation by which the rolling sleeve is held in place by virtue of this interacting groove-shaped design in combination with the clamping force exerted by the ring.

U.S. Pat. No. 4,489,474 relates to means for connecting a tubular flexible member to a piston which includes a recess near the piston end to which is secured a flexible member. The flexible member is wrapped over and around a ring-shaped fitting which secures the flexible member to the piston. The piston comprises a circumferentially extending recess adjacent to its end with the flexible being positioned and substantially filling the recess of the piston. The ring-shaped fitting is a conventional swaged ring and the end portion of the flexible member is trimmed from the portion extending from the piston ring with the flexible member substantially filling the recess of the shoulder of the piston. The piston employs a serrated edge to assist in griping of the flexible member.

U.S. Pat. No. 4,573,692 discloses any assembly for sealing two members, one of which has a cylindrical surface which supports the seal wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,629,170 relates to a pneumatic spring with a pair of chambers formed by a pair of membranes that are sealingly attached to an axially spaced apart retainer and piston wherein the axial end of the membrane is compressed between a serrated surface of a solid member and a retaining ring wherein the ring may be swaged, fitted or otherwise tightened to produce radial compression against the axial ends of the flexible membranes.

British Pat. No. 199,789 discloses a metal securing band which grips a diaphragm and forces it against a tapered end portion of a tubular member.

U.S. Pat. No. 4,718,650 shows an air spring in which the ends of the flexible sleeves are connected to the sealing surfaces of a pair of axially spaced pistons by swaged or crimped clamping rings. The piston clamping surfaces are formed with serrations for assisting to retain the elastomeric material therein when forced therein by the clamping rings.

Other types of piston and end cap sealing arrangements for air springs are shown in U.S. Pat. Nos. 4,784,376; 4,787,607 and 4,787,606, all of which have been assigned to the Assignee of the present invention.

Another known prior art air spring construction includes a radially extending shoulder formed on the piston member on which the clamping ring seats and sealingly clamps the cut end of the flexible sleeve against a plurality of uniformity raised ribs formed on the axially extending sealing surface of the piston member adjacent the annular shoulder. However, such construction as problems in that the clamp ring is not positively positioned on the annular shoulder, and is free to move in an upward axial direction upon the air spring experiencing severe jounce or extended positioning.

SUMMARY OF THE INVENTION

Objectives of the invention include providing an improved clamp ring assembly for air springs, primarily for motor vehicles having a piston at one end and an end cap at an axially spaced opposite end with a flexible elastomeric sleeve extending therebetween and clamped against the respective end cap or piston member by a clamp ring to form a fluid tight seal therebetween and provide an intervening pressurized chamber.

Another objective of the invention is to provide such an improved clamp ring assembly in which the cut edge of the elastomeric sleeve which extends beyond the clamp ring is not exposed thereby eliminating excessive wear of the elastomeric sleeve that heretofore rubbed on the exposed edge during dynamic movement of the air spring.

A still further objective of the invention is to provide such a clamp ring assembly in which movement of the clamp ring is reduced when operating under dynamic conditions by positioning the ring directly on a shoulder of the piston member or annular flange of the end cap thereby maintaining a positive sealing effect with the elastomeric sleeve clamped between the ring and adjacent end member.

A still further objective of the invention is to provide such an improved clamp ring assembly in which the piston member or end cap clamping surface includes a raised male projection which acts in cooperation with a corresponding female or concave groove on the clamp ring to facilitate efficient gripping of the elastomeric material therebetween and to alter the direction of the reinforcing cords contained within the elastomeric sleeve to further increase the clamping effect of the ring, and which positionally locates the clamp ring on the sealing surface of the piston member or end cap.

Another objective of the invention is to provide such an improved clamp ring assembly in which the clamping surface of the piston member and end cap is provided with a pair of projections, preferably having flat surfaces on opposite sides of the intervening male projection, which in cooperation with the male projection provides a series of axially spaced pinch points for securely gripping the elastomeric sleeve material therebetween; in which the flat clamping surfaces of the spaced projections provide greater gripping areas with the intervening elastomeric material; and in which the projection closer to the cut end of the sleeve has a larger diameter than the other projection to provide a greater seal with the flexible sleeve at a location further from the leak path of the fluid chamber.

A still further objective is to provide such an improved clamp ring assembly in which annular expansion grooves are formed between the projections on the piston member and end cap member sealing surfaces to permit the elastomeric material to flow therein; and in which another annular groove is provided adjacent the cut end of the elastomeric sleeve for trapping the cut end to prevent its exposure and subsequent contact with the moving elastomeric sleeve during dynamic conditions.

Another objective is to provide such an improved clamp ring assembly in which the outer surface of the clamp ring generally aligns with the adjacent outer surface of the piston or end cap to provide a generally continuous surface between the clamp ring and piston member or end cap over which the elastomeric sleeve rolls to provide a smooth interface therebetween to reduce wear on the elastomeric sleeve as it moves along the surfaces of the piston member or end cap and clamping ring during dynamic operation of the air spring to reduce wear thereon.

These objectives and advantages are obtained by the improved clamp ring assembly of the invention, the general nature of which may be stated as including a piston member for mounting the air spring on a supporting structure, said piston member having a piston body formed with an annular axially extending sealing surface terminating in an inner radially outwardly extending shoulder, said sealing surface being formed with a radially outwardly extending intermediate annular projection and a pair of radially extending inner and outer annular projections, a flexible sleeve formed of an elastomeric material containing reinforcing cords and having open ends sealingly engaged with the piston member and an end member spaced axially from the piston member and forming a pressurized fluid chamber therebetween; and a continuous annular clamp ring located concentrically about the annular sealing surface of the piston member and clamping one end of the flexible sleeve therebetween, said clamp ring having an axially extending inner clamping surface formed with a concave recess which radially aligns with the intermediate projection of the piston member and a pair of adjacent surfaces each of which aligns with a respective one of the inner and outer piston member projections for positionally locating the clamping band with respect to the piston member and for forming a generally air-tight seal therebetween.

BRIEF DESCRIPTION OF THE DRAWINGS

A preferred embodiment of the invention illustrative of the best mode in which applicants have contemplated applying the principles, is set forth in the following description and is shown in the drawings and is particularly and distinctly pointed out and set forth in the appended claims.

FIG. 2 is a greatly enlarged fragmentary sectional view showing the clamp ring assembly securing one end of the elastomeric sleeve against the sealing surface of the piston member;

FIG. 3 is a top plan view of the clamp ring of the improved clamp ring assembly of the invention;

FIG. 4 is a sectional view of the clamp ring taken on line 4—4, FIG. 3; and

FIG. 5 is an enlarged fragmentary sectional view of a known prior art air spring clamp ring sealing arrangement.

Similar numerals refer to similar parts throughout the drawings.

BEST MODE FOR CARRYING OUT THE INVENTION

Figure 1:
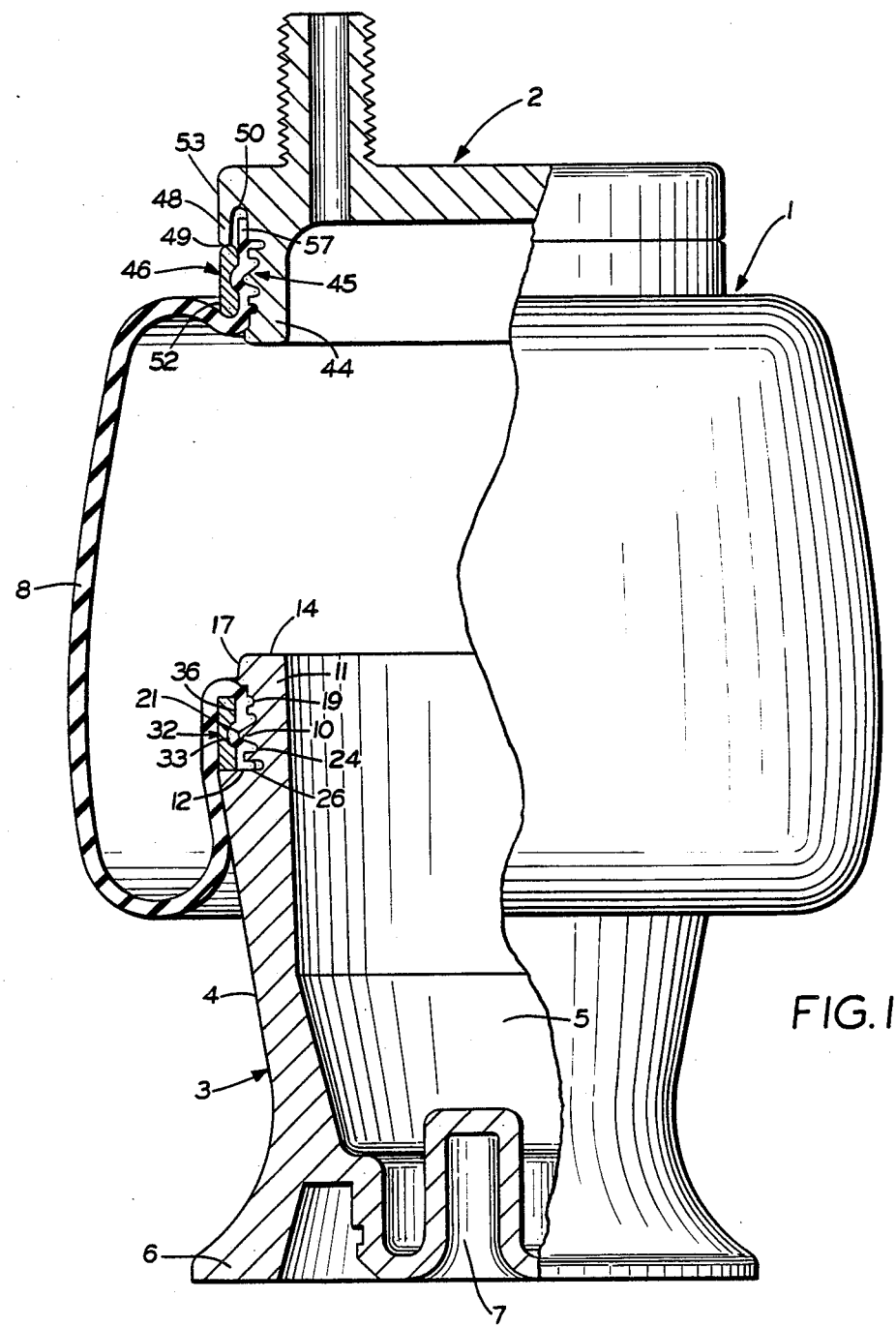
FIG. 1 is an elevational view of the improved clamping ring assembly incorporated into an air spring with portions broken away and in section, with the air spring being shown in a static at-rest position.

The improved clamp ring assembly of the invention is shown mounted on an air spring indicated generally at 1, which is shown in an at-rest position in FIG. 1. Air spring 1 includes axially spaced end members consisting of an end cap and a piston member indicated generally at 2 and 3 respectively. Piston member 3 is a cup-shape member having a generally conical shaped outer wall 4 forming an open interior 5 in a base 6 which is formed with a recessed central portion 7. A flexible sleeve 8 of elastomeric material containing internal reinforcing cords 9 extends between end cap 2 and piston member 3 which are clampingly engaged within the open ends of the sleeve by the clamp ring assembly of the invention and forms a fluid pressure chamber 18 therebetween.

In accordance with the invention, an improved axially extending clamping surface indicated generally at 10, is formed on a reduced diameter upper end portion 11 of piston member 3, shown particularly in detail in FIG. 2. Clamping surface 10 is connected to conical outer wall 4 of the piston member by a radially extending shoulder 12 and a curved corner 13. The open outer end of piston end portion 11 has a radially extending flat surface 14 and a rounded corner 15 which communicates with an annular lip 16 by a generally conical surface 17.

FIG. 5 illustrates the closest known prior art clamp ring and sealing surface arrangement to that of the present invention. A clamp ring 55 is mounted concentrically about an annular sealing surface 56 which is formed with a plurality of small uniform annular ribs 57. Ring 55 is located adjacent a radially extending annular shoulder 58 formed on piston member 59. However, with this prior art air spring construction, there is no means for accurately positioning or maintaining the clamp ring against shoulder 58 since annular ribs 57 merely compress into the elastomeric material of sleeve end 60 to provide an air seal therebetween. Ring 55 must rely on its radial clamping engagement against axially extending sealing surface 56 to retain it in position against shoulder 58 and relies upon the ability of the installer at the time of installation to insure that it is properly positioned against shoulder 58.

In further accordance with the invention, clamping surface 10 includes a pair of annular radially extending clamping projections 19 and 20 and an intermediate radially outwardly extending annular projection 21. Annular projections 19 and 20 preferably have axially extending flat outer surfaces 19A and 20A, with intermediate projection 21 terminating in a convex curved outer surface 21A. Intermediate projection 21 is separated from adjacent projections 19 and 20 by a pair of annular material expansion grooves 23 and 24 which diverge inwardly and away from projection end 21A to provide expansion areas or zones for the movement of the elastomeric material of flexible sleeve 8 therein.

Another radially inwardly extending groove 26 is formed between inner projection 20 and annular shoulder 12 and forms a reservoir for receiving and trapping compressed cut end 27 of elastomeric sleeve 8 and to provide for some expansion of the elastomeric material therein. This trapping of compressed sleeve end 27 prevents it from being exposed and in contact with the remaining portion of the sleeve as the sleeve moves under dynamic conditions which heretofore may have caused unwanted abrasion to the sleeve.

Another groove 29, preferably of a smaller axial width and smaller radially inward extension than that of groove 26, is formed in clamping surface 10 between outer clamping projection 19 and annular lip 16 which provide a somewhat O-ring sealing effect on the sleeve when trapping the elastomeric material therein.

In further accordance with the invention, the clamp ring assembly includes a clamp ring indicated generally at 32, preferably formed of aluminum which is swaged or reduced in diameter or formed of a high strength plastic which is heat shrunk to achieve compression of sleeve 8. Also a snap-on type of clamp ring may be used. Ring 32 is formed with a central recess 33 in an inner diameter axially extending surface 34 which is generally centered between circumferential end surfaces 35 and 36. Inner surface 34 preferably is parallel with an axially extending outer diameter ring surface 37, with inner and outer diameter surfaces 34 and 37 being connected to circumferential end surfaces 35 and 36 by rounded corners 38.

Referring again to FIG. 2, recess 33 of clamp ring 32 aligns and cooperates with intermediate convex projection 21 of piston clamping surface 10 to positionally align the clamping ring on the piston surface for receiving the open end of flexible sleeve 8 therebetween. In this position, circumferential surface 35 of the clamp ring seats upon annular shoulder 12 which prevents movement of clamp ring 32 in the downward axial direction in reference to FIG. 1. This is especially critical during the jounce or collapse position of the air spring in which end member 2 moves axially toward piston member 3. Heretofore, this axial movement of the air spring especially during jounce, could cause movement of the clamp ring resulting in a loosening of the clamping engagement with the sleeve end resulting in premature failure or leakage of the fluid chamber.

Also, as shown in FIG. 2, outer clamp ring surface 37 generally aligns with the junction of rounded corner 13 and conical wall 4 of piston member 3 to provide a smooth continuous transition between the adjacent surfaces. This transition avoids any abrupt changes in direction, or sharp corners or other projections which could damage the flexible sleeve as it moves along and between the adjacent surfaces during dynamic operation of the air spring and provides a generally continuous surface over which the sleeve material moves to reduce excessive wear thereon.

In accordance with other features of the invention, annular lip 16 is spaced from clamp ring corner 38A a distance less than the uncompressed thickness of sleeve 8, represented by arrow A in FIG. 2, to provide a first pinch area on the elastomeric sleeve material. Outer annular projection 19 is spaced a radial distance 40 from inner surface 34 of clamp ring 32, a distance less than the thickness of flexible sleeve 8 to provide a second pinch area. Likewise, the outer surface 21A of intermediate projection 21 is located a radial distance 41 from the bottom surface 33A of recess 33, a distance also less than the thickness of flexible sleeve 8 to form another pinch area. Likewise, surface 20A of projection 20 is located a radial distance 42 from adjacent ring surface 34 to form still another pinch area for clamping the elastomeric material therebetween.

Inner projection 20 preferably has a larger diameter than that of outer projection 19 so as to form a tighter gripping or pinch against the adjacent surface of clamp ring 32. Intermediate projection 21 has a larger diameter than that of projections 19 and 20 so as to extend a further distance into clamp ring recess 33. The tighter pinch area provided by projection 20 is located a greater distance along the potential leak path and is located adjacent cut end 27 of the air spring. Also grooves 23 and 24 provide for some movement or expansion of the compressed elastomeric material therein adjacent each of the pinch areas as the material is squeezed outwardly by the pinching or compression of the elastomeric material at these areas to ensure a tight clamping engagement at the pinch areas.

In accordance with another feature of the invention as shown particularly in FIG. 2, reinforcing cords 9 are caused to change directions due to the radial outward extension of intermediate projection 21 into aligned clamping ring recess 33. This provides a tighter and more stable clamping engagement with the trapped sleeve end since a greater force will be required to pull the sleeve end from between the clamp ring and clamping surface of the piston member, then would be required if the trapped elastomeric material and reinforcing cords were in a generally straight alignment.

In the preferred embodiment, elastomeric sleeve 8 will have a thickness as shown by arrow A in FIG. 2, approximately 0.120 inches. Pinch distance 40 will be approximately 0.060 inches, pinch distance 41 will be approximately 0.080 inches, and pinch distance 42 will be approximately 0.048 inches. These dimensions have been found to provide a very suitable clamping relationship between improved clamp ring 32 and piston clamping surface 10 providing a seal able to withstand relatively high internal fluid pressures in chamber 18.

Referring to FIG. 1, end cap 2 may be formed with an annular axially extending body 44 having an outer axially extending annular sealing surface indicated generally at 45. Sealing surface 45 is formed with a series of axially spaced grooves and projections similar to that formed in clamping surface 10 of piston member 3 and therefore is not described in greater detail. Furthermore, end cap clamp ring 46 may be similar to that of clamp ring 32 of the piston member and thus is not described in greater detail. End cap 2 may be provided with an outer annular flange 48, the lower edge 49 of which prevents the axial movement of clamping ring 46 in a similar manner as does shoulder 12 of piston member 3 during the air spring experiencing dynamic operation.

The relationship of the various grooves and projections of end member sealing surface 45 in cooperation with clamp ring 46 is similar to that described in detail above. Also, outer diameter surface 52 of clamp ring 46 axially aligns with the outer annular surface 53 of end cap flange 48 to provide a generally continuous surface over which the flexible sleeve 8 will move when the air spring is in the jounce position to avoid any sharp corners or projections and to provide a continuous transition between the aligned surfaces in a similar manner as provided by clamp ring surface 37 and outer wall 4 of the piston member described above.

Another feature which has been discovered with respect to the improved clamp ring assembly described above is its ability to increase the effectiveness of the clamping action on larger sizes of air springs. For example, an air spring having a nominal O.D. on the piston member of approximately 140mm was found to be able to withstand higher internal pressure than possible with the heretofore used prior art clamp ring assembly.

These prior art types of clamp rings have a smooth axially extending inner surface and when used on such larger sizes and styles of air springs, have decreased holding power due to the relatively large smooth surface area provided by the internal surface of the clamp ring, in contrast to the improved holding power or unexpected results achieved by the improved clamp ring assembly of the present invention. It is believed that the unique clamping projections formed on the clamping surface of the piston member in combination with the concave recess on the inner surface of the clamp ring, provides such increased holding power not believed achievable with existing clamp ring assemblies.

Accordingly, the improved clamp ring assembly is simplified, provides an effective, safe, inexpensive, and efficient assembly which achieves all the enumerated objectives, eliminates difficulties encountered with prior art clamping assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved clamp assembly for air springs is constructed and used, and characteristics of the improved assembly, and the advantageous, new and useful results obtained; the new and useful structures, devices, elements, arrangements, parts, and combinations, are set forth in the appended claims.

What is claimed is:

1. An improved air spring including:
   (a) A piston member for mounting the air spring on a supporting structure, said piston member having a piston body formed with an annular axially extending sealing surface terminating in an inner radially outwardly extending shoulder, said sealing surface being formed with a radially outwardly extending intermediate annular projection and a pair of radially extending inner and outer annular projections;
   (b) A flexible sleeve formed of an elastomeric material containing reinforcing cords and having open ends sealingly engaged with the piston member and an end cap spaced axially from the piston member and forming a pressurized fluid chamber therebetween; and
   (c) a continuous annular clamp ring located concentrically about the annular sealing surface of the piston member and clamping one end of the flexible sleeve therebetween, said clamp ring having an axially extending inner clamping surface formed with a concave recess which radially aligns with the intermediate projection of the piston member and a pair of adjacent surfaces each of which aligns with a respective one of the inner and outer piston member projections for positionally locating the clamp ring with respect to the piston member and for forming a generally air-tight seal therebetween.

2. The air spring defined in claim 1 in which the inner projection of the piston member sealing surface has a greater diameter than the diameter of the outer projection.

3. The air spring defined in claim 1 in which the inner and outer projections of the piston member sealing surface terminate in generally flat axially extending end surfaces.

4. The air spring defined in claim 3 in which the end surfaces of the inner and outer projections extend generally parallel with the axially extending inner surface of the clamp ring.

5. The air spring defined in claim 3 in which the flat end surface of the inner projection of the piston member sealing surface is spaced radially from the axially extending inner surface of the clamp ring a distance less than one-half and greater than one-third the thickness of the flexible sleeve.

6. The air spring defined in claim 3 in which the flat end surface of the outer projection of the piston member sealing surface is spaced radially from the axially extending inner surface of the clamp ring a distance approximately one-half the thickness of the flexible sleeve.

7. The air spring defined in claim 1 in which the intermediate projection of the piston member sealing surface has a generally convex cross-sectional configuration and terminates in a curved outer end; and in which the intermediate projection is separated from the inner and outer projections by annular concave grooves.

8. The air spring defined in claim 7 in which the curved outer end of the intermediate projection is spaced generally radially from the surface of the concave recess a distance approximately three-fourths the thickness of the flexible sleeve.

9. The air spring defined in claim 1 in which the sealing surface of the piston member terminates in an outer radially extending annular lip.

10. The air spring defined in claim 1 in which a circumferential edge surface of the clamp ring generally seats up the radially extending shoulder of the piston member to reduce axial movement of the clamp ring during operation of the air spring.

11. The air spring defined in claim 10 in which the annular shoulder of the piston member terminates into the piston body by a curved corner; and in which the clamp ring has an outer annular axially extending surface which generally aligns with curved corner of the piston body to provide a substantially continuous surface on which the flexible sleeve may roll during operation of the air spring.

12. The air spring defined in claim 11 in which the piston body has a generally conical configuration adjacent the curved corner on which the flexible sleeve rolls during operation of the air spring.

13. The air spring defined in claim 1 in which the inner projection of the piston member sealing surface is separated from the annular shoulder by a radially inwardly extending reservoir groove for receiving excess elastomeric material at the open end of the flexible sleeve.

14. The air spring defined in claim 13 in which the intermediate projection is separated from the inner and outer projections by radially inwardly extending expansion grooves; and in which the reservoir grooves extends radially inwardly to a greater extent than the expansion grooves.

15. The air spring defined in claim 14 in which the sealing surface of the piston member terminates is an outer annular lip., and in which a sealing groove is formed in the sealing surface between said outer lip and adjacent expansion groove to provide an O-ring effect on the flexible sleeve.

16. The air spring defined in claim 15 in which the clamp ring has rounded corners; and in which the outer annular lip, of the piston member is spaced from one of said rounded corners of the clamping ring a distance less than the thickness of the flexible sleeve to provide a pinch point therebetween.

17. The air spring defined in claim 1 in which the clamp ring includes an outer surface which extends generally parallel with the inner clamping surface and a pair of opposed generally parallel circumferential end surfaces merging into said inner and outer surfaces by curved corners.

18. An improved air spring including:
(a) a pair of end members adapted to be mounted at generally axially spaced locations;
(b) a flexible sleeve formed of an elastomeric material containing reinforcing cords and having open ends sealingly engaged with the end members forming a pressurized fluid chamber therebetween;
(c) an annular axially extending sealing surface formed on at least one of said end members, said sealing surface being formed with a pair of axially spaced annular clamping surfaces and an intermediate annular projection extending radially outwardly beyond said clamping surfaces;
(d) a continuous clamp ring located concentrically with respect to the annular sealing surface for sealingly clamping one end of the flexible sleeve therebetween, said clamp ring having an axially extending inner clamping surface formed with a concave recess cooperating with the intermediate projection to positionally locate said ring with respect to said one end member, and with said projection and spaced clamping surfaces of the clamp ring providing a series of axially spaced pinch areas for clamping the flexible sleeve therebetween and for changing the direction of travel of the reinforcing cords in the clamped sleeve end; and
(e) generally radially extending groove means being formed in the said one end member for trapping a compressed end of the flexible sleeve therein.

19. The air spring defined in claim 18 in which one of the axially spaced clamping surfaces of said one end member is radially spaced a greater distance from the axial inner surface of the clamp ring than the other of said clamping surfaces.

20. The air spring defined in claim 18 in which the axially spaced clamping surfaces are separated from the intermediate projection by annular grooves providing expansion areas for certain portions of the flexible sleeve clamped by said clamping surfaces.

21. The air spring defined in claim 18 in which a generally radially extending surface is formed on said one end member which abuts with a circumferential end of the clamp ring to restrict axial movement of said ring during operation of the air spring.

22. The air spring defined in claim 21 in which the said one end member is an end cap with the axial clamping surface thereof extending into the open end of the flexible sleeve; and in which the radially extending surface of said one end member is an annular retaining flange extending generally parallel with and spaced from a portion of the sealing surface of said one end member.

23. An improved air spring including:
(a) a pair of end members adapted to be mounted at generally axially spaced locations, at least one of said end members being formed with a radially outwardly extending annular shoulder;
(b) a flexible sleeve formed of an elastomeric material having open ends sealingly engaged with the end members forming a pressurized fluid chamber therebetween;
(c) an annular axially extending sealing surface formed on said one end member, said sealing surface having an annular projection spaced axially from the annular shoulder and extending radially outwardly at distance less then said annular shoulder;
(d) a continuous clamp ring located concentrically with respect to the annular sealing surface for sealingly clamping one end of the flexible sleeve therebetween, said clamp ring abutting the annular shoulder to restrict movement of said ring in an axial direction during operation of the air spring, said clamp ring having an axially extending inner clamping surface formed with a concave recess cooperating with the annular projection on the sealing surface to positionally locate said ring with respect to the annular shoulder and sealing surface of said one end member.

24. The air spring defined in claim 23 in which generally radially extending groove means is formed in the sealing surface of said one end member for trapping and concealing a compressed end of the flexible sleeve therein.

25. The air spring defined in claim 23 in which the sealing surface of said one end member is formed with a pair of annular clamping surfaces axially spaced about the annular projection; in which said clamping surfaces are separated from the annular projection by annular grooves; and in which one of said annular clamping surfaces has a greater diameter than the other of said annular clamping surfaces.

26. The air spring defined in claim 23 in which the clamp ring has an outer annular axially extending surface which axially aligns with an outer annular surface of said one end member to provide a substantially continuous exterior surface on which the flexible sleeve rolls during operation of the air spring.

27. A fluid pressure device including a pair of spaced end members and an intervening flexible sleeve of elastomeric material having open ends sealingly clamped against sealing surfaces formed on each of said end members providing a fluid pressure chamber therebetween; a radially extending annular shoulder formed on at least one of said end members adjacent the sealing surface thereof and terminating in a generally axially extending outer surface of said one end member; an annular clamp ring sealingly clamping one end of the flexible sleeve against the sealing surface of one of the members and abutting the annular shoulder to restrict axial movement of said ring in one direction during operation of the device; and annular projection means formed on the sealing surface of said one end member for cooperation with annular groove means formed on the clamp ring for positionally locating the clamp ring on the annular shoulder of the said one end member, said end members being an end cap and a piston member of an air spring with the projection means being a radially outwardly extending annular convex projection formed on the sealing surface of the piston member and the clamp ring having an axially extending inner clamping surface with the groove means being a concave recess formed in said axially extending inner clamping surface, wherein said concave recess cooperates with the convex annular projection of the sealing surface to positionally locate said ring with respect to the annular shoulder and outer axial surface of said end member.

28. The fluid pressure device defined in claim 27 in which the sealing surface of the piston member includes a pair of annular generally flat projections axially spaced about the convex projection and separated therefrom by annular material expansion grooves.

* * * * *